(12) United States Patent
Kim et al.

(10) Patent No.: US 9,866,307 B2
(45) Date of Patent: Jan. 9, 2018

(54) METHOD FOR TRANSCEIVING DATA SYMBOL USING ANTENNA CORRELATION IN WIRELESS ACCESS SYSTEM WHICH SUPPORTS MASSIVE ANTENNA

(71) Applicant: LG ELECTRONICS INC., Seoul (KR)

(72) Inventors: Kitae Kim, Seoul (KR); Jinmin Kim, Seoul (KR); Kwangseok Noh, Seoul (KR); Kukheon Choi, Seoul (KR); Jaehoon Chung, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 15 days.

(21) Appl. No.: 14/903,251

(22) PCT Filed: Jul. 14, 2014

(86) PCT No.: PCT/KR2014/006307
§ 371 (c)(1),
(2) Date: Jan. 6, 2016

(87) PCT Pub. No.: WO2015/008992
PCT Pub. Date: Jan. 22, 2015

(65) Prior Publication Data
US 2016/0127030 A1    May 5, 2016

Related U.S. Application Data

(60) Provisional application No. 61/846,052, filed on Jul. 14, 2013.

(51) Int. Cl.
*H04B 7/08*    (2006.01)
*H04B 7/04*    (2017.01)
(Continued)

(52) U.S. Cl.
CPC ......... *H04B 7/0854* (2013.01); *H04B 7/0413* (2013.01); *H04L 5/0023* (2013.01); *H04L 5/14* (2013.01)

(58) Field of Classification Search
None
See application file for complete search history.

(56) References Cited

U.S. PATENT DOCUMENTS 8,149,942 B1 *   4/2012   Wang .................. H04B 7/0617
                                                          375/267
8,576,937 B2 *   11/2013  Han ..................... H04B 7/0417
                                                          375/267
(Continued)

FOREIGN PATENT DOCUMENTS

EP    1315311    5/2003
EP    2521278    11/2012
(Continued)

OTHER PUBLICATIONS

PCT International Application No. PCT/KR2014/006307, Written Opinion of the International Searching Authority dated Oct. 27, 2014, 17 pages.
(Continued)

*Primary Examiner* — Hicham Foud
(74) *Attorney, Agent, or Firm* — Lee Hong Degerman Kang Waimey

(57) ABSTRACT

A method and device for transmitting data symbols using an antenna correlation in a wireless access system supporting multiple input/multiple output (MIMO) operations. The method includes: receiving, from a receiving end, grouping information of a plurality of antennas for supporting the MIMO operations, where the grouping information includes information on the two selected antenna subgroups; selecting two antennas of which a correlation is highest from the two selected antenna subgroups respectively for transmitting
(Continued)

the data symbols; and transmitting different data symbols through each of the two selected antennas of the two selected antenna subgroups on an identical time frequency resource. Here, antennas with a highest correlation are grouped into two or more antenna subgroups. Also, two antenna subgroups, of which a correlation is lowest from the two or more antenna subgroups, are selected among the two or more antenna subgroups by the receiving end.

8 Claims, 16 Drawing Sheets

(51) Int. Cl.
*H04L 5/00* (2006.01)
*H04L 5/14* (2006.01)
*H04B 7/0413* (2017.01)

(56) References Cited

U.S. PATENT DOCUMENTS

| | | | |
|---|---|---|---|
| 2002/0132600 A1 | 9/2002 | Rudrapatna et al. | |
| 2005/0101259 A1* | 5/2005 | Tong | H04B 7/0417 455/69 |
| 2006/0153227 A1* | 7/2006 | Hwang | H04L 1/0025 370/465 |
| 2007/0286124 A1* | 12/2007 | Grant | H04B 7/0452 370/331 |
| 2011/0306371 A1 | 12/2011 | Kitahara | |
| 2012/0275531 A1 | 11/2012 | Wu et al. | |
| 2013/0010880 A1 | 1/2013 | Koivisto et al. | |
| 2014/0169328 A1* | 6/2014 | Ahimezawa | H04B 7/0452 370/330 |
| 2015/0372732 A1* | 12/2015 | Kim | H04B 7/04 375/267 |
| 2015/0372793 A1* | 12/2015 | Kang | H04B 7/0417 370/329 |
| 2016/0050050 A1* | 2/2016 | Kang | H04B 7/0617 370/329 |
| 2016/0087708 A1* | 3/2016 | Kang | H04B 7/0619 370/312 |
| 2016/0149680 A1* | 5/2016 | Kang | H04B 7/0417 370/329 |

FOREIGN PATENT DOCUMENTS

| | | |
|---|---|---|
| KR | 10-2008-0087369 | 10/2008 |
| WO | 2010050874 | 5/2010 |
| WO | 2010142319 | 12/2010 |

OTHER PUBLICATIONS

European Patent Office Application Serial No. 14826278.5, Search Report dated Jan. 20, 2017, 10 pages.
Nortel, "Link Level Evaluation on Fixed Beamforming Plus MIMO Precoding versus Adaptive Beamforming", R1-073306, 3GPP TSG RAN WG1 Meeting #50, Aug. 2007, 16 pages.

* cited by examiner

FIG. 4
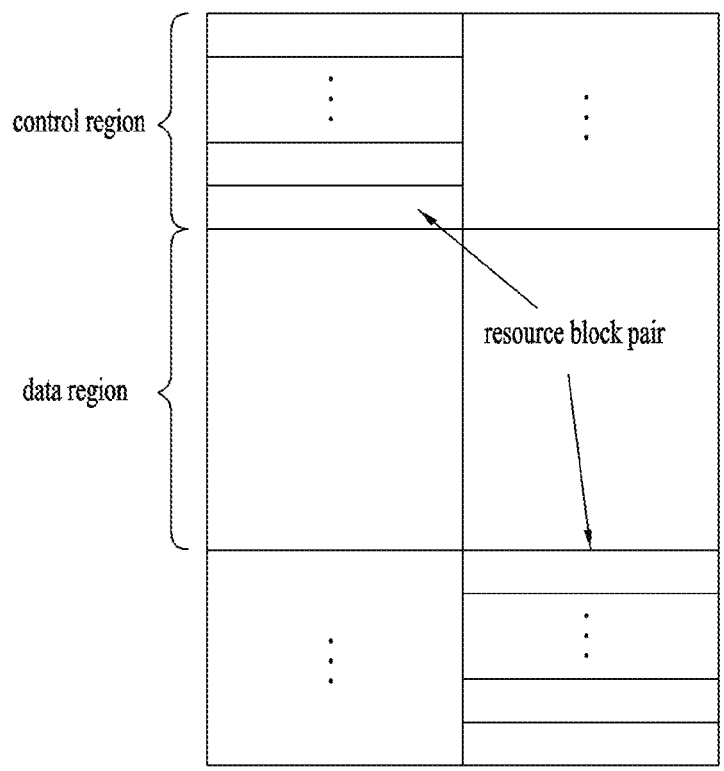
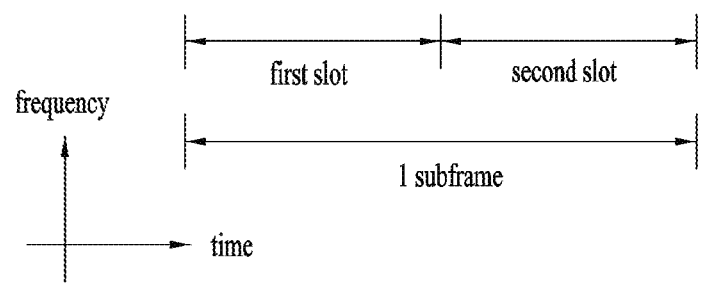

(a)  (b)

FIG. 11
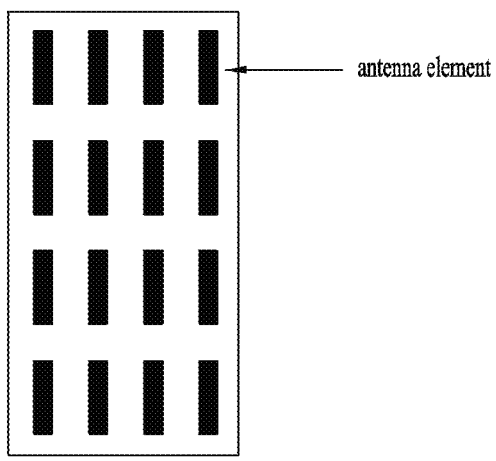
FIG. 12
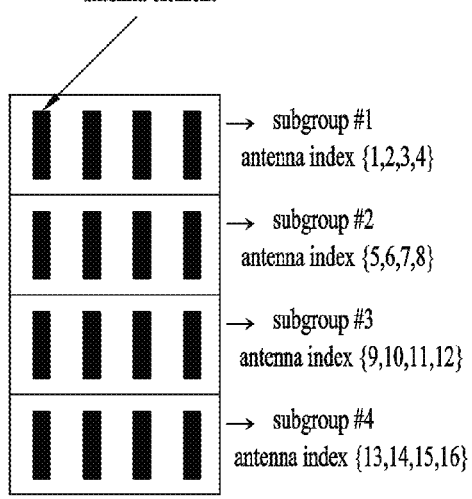 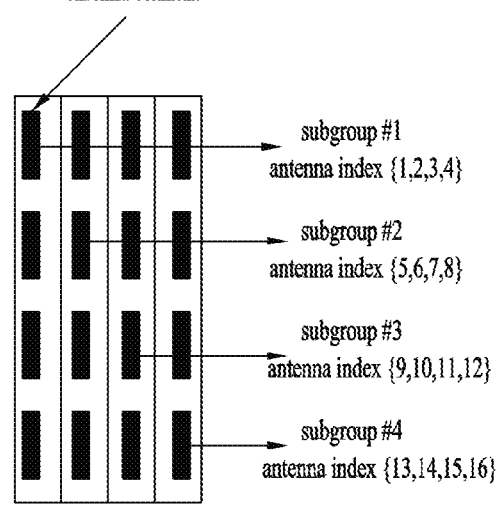
(a)                          (b)

METHOD FOR TRANSCEIVING DATA SYMBOL USING ANTENNA CORRELATION IN WIRELESS ACCESS SYSTEM WHICH SUPPORTS MASSIVE ANTENNA

CROSS-REFERENCE TO RELATED APPLICATIONS

This application is the National Stage filing under 35 U.S.C. 371 of International Application No. PCT/KR2014/006307, filed on Jul. 14, 2014, which claims the benefit of U.S. Provisional Application No. 61/846,052, filed on Jul. 14, 2013, the contents of which are all hereby incorporated by reference herein in their entirety.

TECHNICAL FIELD

The present invention relates to a wireless access system, and more particularly, to a method of transceiving a data symbol using a correlation of antennas consisting of a massive antenna and an apparatus therefor.

BACKGROUND ART

Wireless access systems have been widely deployed to provide various types of communication services such as voice or data. In general, a wireless access system is a multiple access system that supports communication of multiple users by sharing available system resources (a bandwidth, transmission power, etc.) among them. For example, multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, and a Single Carrier Frequency Division Multiple Access (SC-FDMA) system.

DISCLOSURE OF THE INVENTION

Technical Tasks

An object of the present invention is to provide a method of efficiently performing communication.

Another object of the present invention is to provide a method of securing a transmit diversity using a correlation of an antenna in communication environment equipped with a massive antenna.

The other object of the present invention is to provide an apparatus supporting the aforementioned methods.

It will be appreciated by persons skilled in the art that the objects that could be achieved with the present invention are not limited to what has been particularly described hereinabove and the above and other objects that the present invention could achieve will be more clearly understood from the following detailed description.

Technical Solution

The present invention provides a method of transceiving data symbols using a correlation of antennas constructing a massive antenna in a wireless access system and apparatuses therefor.

To achieve these and other advantages and in accordance with the purpose of the present invention, as embodied and broadly described, according to one embodiment, a method of transmitting data symbols using an antenna correlation in a wireless access system supporting a massive antenna can include the steps of grouping antennas of which a correlation is highest among a plurality of antennas constructing the massive antenna into two or more antenna subgroups, selecting antenna subgroups of which a correlation is lowest from the two or more antenna subgroups, selecting antennas for transmitting the data symbols from the selected antenna subgroups and transmitting the data symbols using the selected antennas.

In this case, the data symbols can be transmitted via the selected antennas different from each other while being transmitted via an identical time-frequency resource.

And, the method can further include the step of transmitting antenna configuration information indicating the antenna subgroups and/or the selected antennas to a receiving end.

And, the method can further include the step of receiving a feedback on a message including correlation information on a plurality of the antennas constructing the massive antenna. In this case, the grouping step and the antenna selecting step can be performed based on the correlation information.

In this case, the selected antennas can be selected in consideration of the number of antenna ports of a transmitting end and the number of the data symbols.

To further achieve these and other advantages and in accordance with the purpose of the present invention, according to a different embodiment, a transmitting end transmitting data symbols using an antenna correlation in a wireless access system supporting a massive antenna can include the massive antenna and a processor configured to transmit the data symbols using the antenna correlation, the processor configured to group antennas of which a correlation is highest among a plurality of antennas constructing the massive antenna into two or more antenna subgroups, the processor configured to select antenna subgroups of which a correlation is lowest from the two or more antenna subgroups, the processor configured to select antennas for transmitting the data symbols from the selected antenna subgroups, the processor configured to transmit the data symbols using the selected antennas.

In this case, the data symbols can be transmitted via the selected antennas different from each other while being transmitted via an identical time-frequency resource.

The processor can be configured to transmit antenna configuration information indicating the antenna subgroups and/or the selected antennas to a receiving end via the massive antenna.

The processor is configured to receive a feedback on a message including correlation information on a plurality of the antennas constructing the massive antenna and the processor can be configured to group the massive antenna and select the antennas based on the correlation information.

In this case, the selected antennas can be selected in consideration of the number of antenna ports of a transmitting end and the number of the data symbols.

The afore-described aspects of the present invention are merely a part of preferred embodiments of the present invention. Those skilled in the art will derive and understand various embodiments reflecting the technical features of the present invention from the following detailed description of the present invention.

Advantageous Effects

According to the embodiments of the present invention, the following effects can be achieved.

First of all, it is able to efficiently transmit data using a massive antenna.

Secondly, it is able to provide a transmit diversity by selecting an antenna based on a correlation of massive antennas.

Thirdly, it is able to precisely estimate a radio channel between a transmitting end and a receiving end by transmitting configuration information on selected antennas.

It will be appreciated by persons skilled in the art that that the effects that can be achieved through the present invention are not limited to what has been particularly described hereinabove and other advantages of the present invention will be more clearly understood from the following detailed description.

DESCRIPTION OF DRAWINGS

The accompanying drawings, which are included to provide a further understanding of the invention, illustrate embodiments of the invention and together with the description serve to explain the principle of the invention. In the drawings:

FIG. 4 illustrates a structure of an UpLink (UL) subframe, which may be used in embodiments of the present invention;

FIG. 11 is a diagram for an example of configuring a two dimensional massive antenna;

FIG. 12 is a diagram for an example of a method of grouping two dimensional massive antennas;

BEST MODE

Mode for Invention

Figure 1:
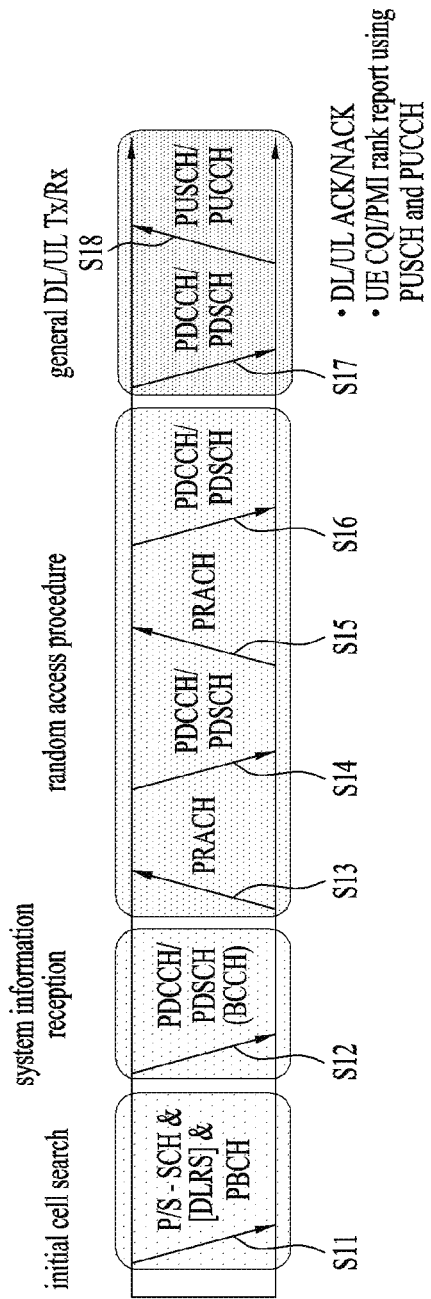
FIG. 1 illustrates physical channels and a general signal transmission method using the physical channels, which may be used in embodiments of the present invention.

Embodiments of the present invention described in the following provide a method of transceiving a data symbol using a correlation of antennas consisting of a massive antenna and apparatuses therefor.

The embodiments of the present invention described below are combinations of elements and features of the present invention in specific forms. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions or elements of any one embodiment may be included in another embodiment and may be replaced with corresponding constructions or features of another embodiment.

In the description of the attached drawings, a detailed description of known procedures or steps of the present invention will be avoided lest it should obscure the subject matter of the present invention. In addition, procedures or steps that could be understood to those skilled in the art will not be described either.

In the embodiments of the present invention, a description is mainly made of a data transmission and reception relationship between a Base Station (BS) and a User Equipment (UE). A BS refers to a terminal node of a network, which directly communicates with a UE. A specific operation described as being performed by the BS may be performed by an upper node of the BS.

Namely, it is apparent that, in a network comprised of a plurality of network nodes including a BS, various operations performed for communication with a UE may be performed by the BS, or network nodes other than the BS. The term 'BS' may be replaced with a fixed station, a Node B, an evolved Node B (eNode B or eNB), an Advanced Base Station (ABS), an access point, etc.

In the embodiments of the present invention, the term terminal may be replaced with a UE, a Mobile Station (MS), a Subscriber Station (SS), a Mobile Subscriber Station (MSS), a mobile terminal, an Advanced Mobile Station (AMS), etc.

A transmitter is a fixed and/or mobile node that provides a data service or a voice service and a receiver is a fixed and/or mobile node that receives a data service or a voice service. Therefore, a UE may serve as a transmitter and a BS may serve as a receiver, on an UpLink (UL). Likewise, the UE may serve as a receiver and the BS may serve as a transmitter, on a DL.

The embodiments of the present invention may be supported by standard specifications disclosed for at least one of wireless access systems including an Institute of Electrical and Electronics Engineers (IEEE) 802.xx system, a 3rd Generation Partnership Project (3GPP) system, a 3GPP Long Term Evolution (LTE) system, and a 3GPP2 system. In particular, the embodiments of the present invention may be supported by the standard specifications, 3GPP TS 36.211, 3GPP TS 36.212, 3GPP TS 36.213, and 3GPP TS 36.321. That is, the steps or parts, which are not described to clearly reveal the technical idea of the present invention, in the embodiments of the present invention may be explained by the above standard specifications. All terms used in the embodiments of the present invention may be explained by the standard specifications.

Reference will now be made in detail to the preferred embodiments of the present invention with reference to the accompanying drawings. The detailed description, which will be given below with reference to the accompanying drawings, is intended to explain exemplary embodiments of the present invention, rather than to show the only embodiments that can be implemented according to the invention.

The following detailed description includes specific terms in order to provide a thorough understanding of the present invention. However, it will be apparent to those skilled in the art that the specific terms may be replaced with other terms without departing the technical spirit and scope of the present invention.

For example, the term used in embodiments of the present invention, 'synchronization signal' is interchangeable with a synchronization sequence, a training symbol or a synchronization preamble in the same meaning.

The embodiments of the present invention can be applied to various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), etc.

CDMA may be implemented as a radio technology such as Universal Terrestrial Radio Access (UTRA) or CDMA2000. TDMA may be implemented as a radio technology such as Global System for Mobile communications (GSM)/General packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved UTRA (E-UTRA), etc.

UTRA is a part of Universal Mobile Telecommunications System (UMTS). 3GPP LTE is a part of Evolved UMTS (E-UMTS) using E-UTRA, adopting OFDMA for DL and SC-FDMA for UL. LTE-Advanced (LTE-A) is an evolution of 3GPP LTE. While the embodiments of the present invention are described in the context of a 3GPP LTE/LTE-A system in order to clarify the technical features of the present invention, the present invention is also applicable to an IEEE 802.16e/m system, etc.

1. 3GPP LTE/LTE-A System

In a wireless access system, a UE receives information from an eNB on a DL and transmits information to the eNB on a UL. The information transmitted and received between the UE and the eNB includes general data information and various types of control information. There are many physical channels according to the types/usages of information transmitted and received between the eNB and the UE.

1.1 System Overview

FIG. 1 illustrates physical channels and a general method using the physical channels, which may be used in embodiments of the present invention.

When a UE is powered on or enters a new cell, the UE performs initial cell search (S11). The initial cell search involves acquisition of synchronization to an eNB. Specifically, the UE synchronizes its timing to the eNB and acquires information such as a cell Identifier (ID) by receiving a Primary Synchronization Channel (P-SCH) and a Secondary Synchronization Channel (S-SCH) from the eNB.

Then the UE may acquire information broadcast in the cell by receiving a Physical Broadcast Channel (PBCH) from the eNB.

During the initial cell search, the UE may monitor a DL channel state by receiving a Downlink Reference Signal (DL RS).

After the initial cell search, the UE may acquire more detailed system information by receiving a Physical Downlink Control Channel (PDCCH) and receiving a Physical Downlink Shared Channel (PDSCH) based on information of the PDCCH (S12).

To complete connection to the eNB, the UE may perform a random access procedure with the eNB (S13 to S16). In the random access procedure, the UE may transmit a preamble on a Physical Random Access Channel (PRACH) (S13) and may receive a PDCCH and a PDSCH associated with the PDCCH (S14). In the case of contention-based random access, the UE may additionally perform a contention resolution procedure including transmission of an additional PRACH (S15) and reception of a PDCCH signal and a PDSCH signal corresponding to the PDCCH signal (S16).

After the above procedure, the UE may receive a PDCCH and/or a PDSCH from the eNB (S17) and transmit a Physical Uplink Shared Channel (PUSCH) and/or a Physical Uplink Control Channel (PUCCH) to the eNB (S18), in a general UL/DL signal transmission procedure.

Control information that the UE transmits to the eNB is generically called Uplink Control Information (UCI). The UCI includes a Hybrid Automatic Repeat and reQuest Acknowledgement/Negative Acknowledgement (HARQ-ACK/NACK), a Scheduling Request (SR), a Channel Quality Indicator (CQI), a Precoding Matrix Index (PMI), a Rank Indicator (RI), etc.

In the LTE system, UCI is generally transmitted on a PUCCH periodically. However, if control information and traffic data should be transmitted simultaneously, the control information and traffic data may be transmitted on a PUSCH. In addition, the UCI may be transmitted aperiodically on the PUSCH, upon receipt of a request/command from a network.

Figure 2:
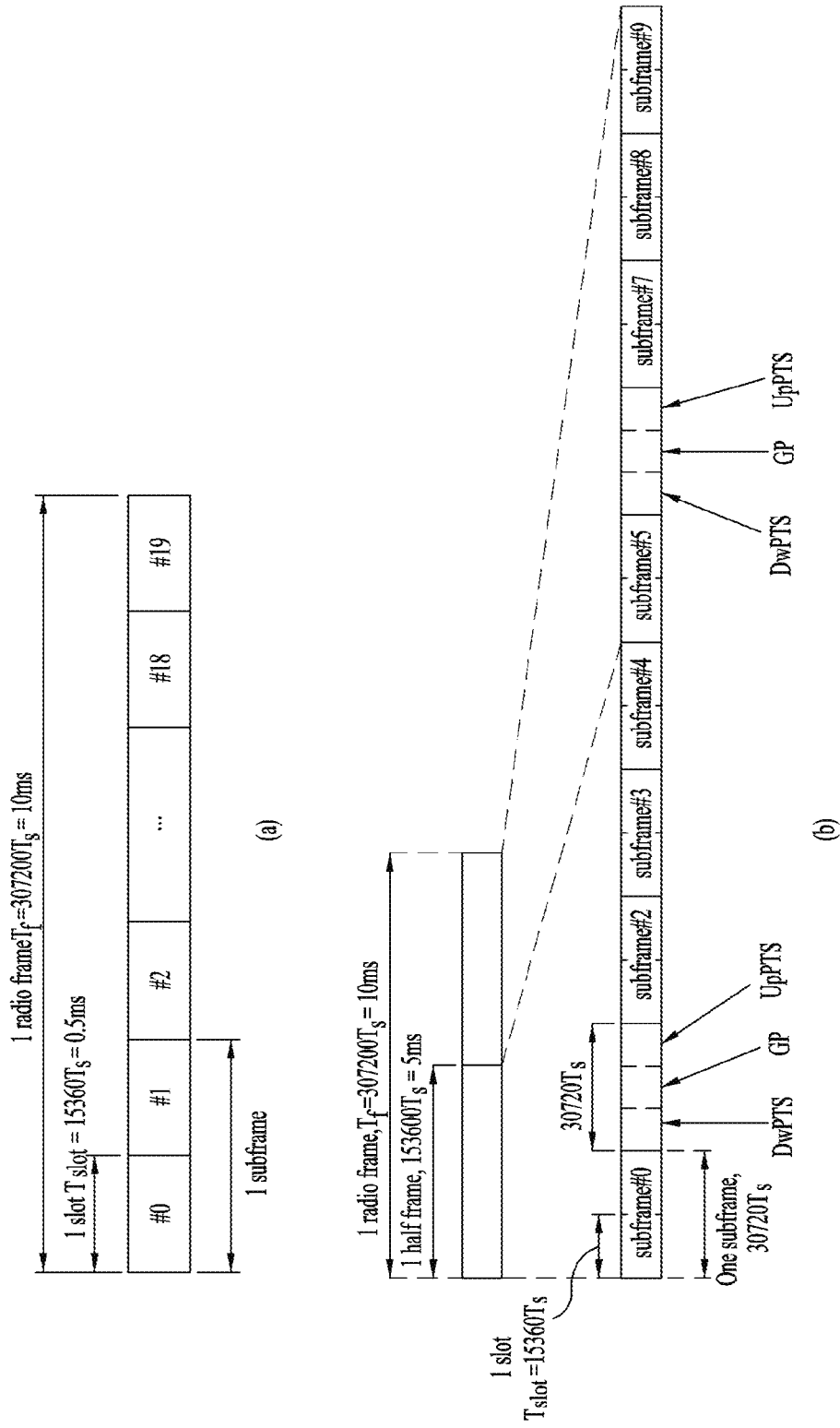
FIG. 2 illustrates radio frame structures used in embodiments of the present invention.

FIG. 2 illustrates exemplary radio frame structures used in embodiments of the present invention.

FIG. 2(a) illustrates frame structure type 1. Frame structure type 1 is applicable to both a full Frequency Division Duplex (FDD) system and a half FDD system.

One radio frame is 10 ms ($T_f=307200 \cdot T_s$) long, including equal-sized 20 slots indexed from 0 to 19. Each slot is 0.5 ms ($T_{slot}=15360 \cdot T_s$) long. One subframe includes two successive slots. An $i^{th}$ subframe includes $2i^{th}$ and $(2i+1)^{th}$ slots. That is, a radio frame includes 10 subframes. A time required for transmitting one subframe is defined as a Transmission Time Interval (TTI). Ts is a sampling time given as $T_s=1/(15 \text{ kHz} \times 2048)=3.2552 \times 10^{-8}$ (about 33 ns). One slot includes a plurality of Orthogonal Frequency Division Multiplexing (OFDM) symbols or SC-FDMA symbols in the time domain by a plurality of Resource Blocks (RBs) in the frequency domain.

A slot includes a plurality of OFDM symbols in the time domain. Since OFDMA is adopted for DL in the 3GPP LTE system, one OFDM symbol represents one symbol period. An OFDM symbol may be called an SC-FDMA symbol or symbol period. An RB is a resource allocation unit including a plurality of contiguous subcarriers in one slot.

In a full FDD system, each of 10 subframes may be used simultaneously for DL transmission and UL transmission during a 10-ms duration. The DL transmission and the UL transmission are distinguished by frequency. On the other hand, a UE cannot perform transmission and reception simultaneously in a half FDD system.

The above radio frame structure is purely exemplary. Thus, the number of subframes in a radio frame, the number of slots in a subframe, and the number of OFDM symbols in a slot may be changed.

FIG. 2(b) illustrates frame structure type 2. Frame structure type 2 is applied to a Time Division Duplex (TDD)

system. One radio frame is 10 ms ($T_f$=307200·$T_s$) long, including two half-frames each having a length of 5 ms (=153600·$T_s$) long. Each half-frame includes five subframes each being 1 ms (=30720·$T_s$) long. An $i^{th}$ subframe includes $2i^{th}$ and $(2i+1)^{th}$ slots each having a length of 0.5 ms ($T_{slot}$=15360·$T_s$). $T_s$ is a sampling time given as $T_s$=1/(15 kHz×2048)=3.2552×10$^{-8}$ (about 33 ns).

A type-2 frame includes a special subframe having three fields, Downlink Pilot Time Slot (DwPTS), Guard Period (GP), and Uplink Pilot Time Slot (UpPTS). The DwPTS is used for initial cell search, synchronization, or channel estimation at a UE, and the UpPTS is used for channel estimation and UL transmission synchronization with a UE at an eNB. The GP is used to cancel UL interference between a UL and a DL, caused by the multi-path delay of a DL signal.

[Table 1] below lists special subframe configurations (DwPTS/GP/UpPTS lengths).

the other OFDM symbols of the DL subframe are used as a data region to which a PDSCH is allocated. DL control channels defined for the 3GPP LTE system include a Physical Control Format Indicator Channel (PCFICH), a PDCCH, and a Physical Hybrid ARQ Indicator Channel (PHICH).

The PCFICH is transmitted in the first OFDM symbol of a subframe, carrying information about the number of OFDM symbols used for transmission of control channels (i.e. the size of the control region) in the subframe. The PHICH is a response channel to a UL transmission, delivering an HARQ ACK/NACK signal. Control information carried on the PDCCH is called Downlink Control Information (DCI). The DCI transports UL resource assignment information, DL resource assignment information, or UL Transmission (Tx) power control commands for a UE group.

2. Wireless Access System Supporting Massive Antenna

Embodiments of the present invention provides a method of securing a transmit diversity using a correlation of

TABLE 1

| | | Normal cyclic prefix in downlink | | | Extended cyclic Prefix in downlink | |
|---|---|---|---|---|---|---|
| | | UpPTS | | | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
| 0 | 6592 · $T_s$ | 2192 · $T_s$ | 2560 · $T_s$ | 7680 · $T_s$ | 2192 · $T_s$ | 2560 · $T_s$ |
| 1 | 19760 · $T_s$ | | | 20480 · $T_s$ | | |
| 2 | 21952 · $T_s$ | | | 23040 · $T_s$ | | |
| 3 | 24144 · $T_s$ | | | 25600 · $T_s$ | | |
| 4 | 26336 · $T_s$ | | | 7680 · $T_s$ | 4384 · $T_s$ | 5120 · $T_s$ |
| 5 | 6592 · $T_s$ | 4384 · $T_s$ | 5120 · $T_s$ | 20480 · $T_s$ | | |
| 6 | 19760 · $T_s$ | | | 23040 · $T_s$ | | |
| 7 | 21952 · $T_s$ | | | — | — | — |
| 8 | 24144 · $T_s$ | | | — | — | — |

Figure 3:
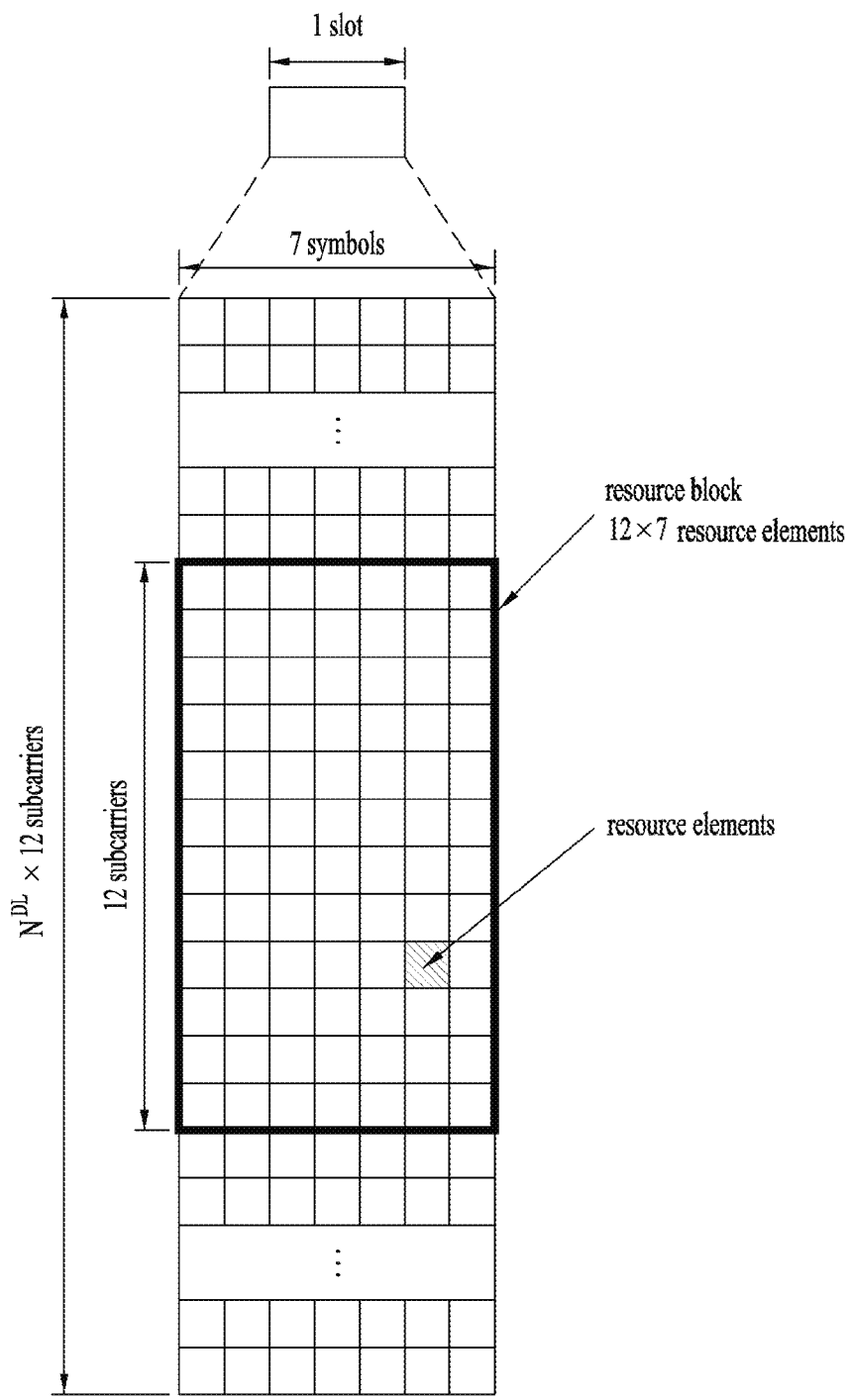
FIG. 3 illustrates a structure of a DownLink (DL) resource grid for the duration of one DL slot, which may be used in embodiments of the present invention.

FIG. 3 illustrates an exemplary structure of a DL resource grid for the duration of one DL slot, which may be used in embodiments of the present invention.

Referring to FIG. 3, a DL slot includes a plurality of OFDM symbols in the time domain. One DL slot includes 7 OFDM symbols in the time domain and an RB includes 12 subcarriers in the frequency domain, to which the present invention is not limited.

Each element of the resource grid is referred to as a Resource Element (RE). An RB includes 12×7 REs. The number of RBs in a DL slot, NDL depends on a DL transmission bandwidth. A UL slot may have the same structure as a DL slot.

FIG. 4 illustrates a structure of a UL subframe which may be used in embodiments of the present invention.

Referring to FIG. 4, a UL subframe may be divided into a control region and a data region in the frequency domain. A PUCCH carrying UCI is allocated to the control region and a PUSCH carrying user data is allocated to the data region. To maintain a single carrier property, a UE does not transmit a PUCCH and a PUSCH simultaneously. A pair of RBs in a subframe are allocated to a PUCCH for a UE. The RBs of the RB pair occupy different subcarriers in two slots. Thus it is said that the RB pair frequency-hops over a slot boundary.

Figure 5:
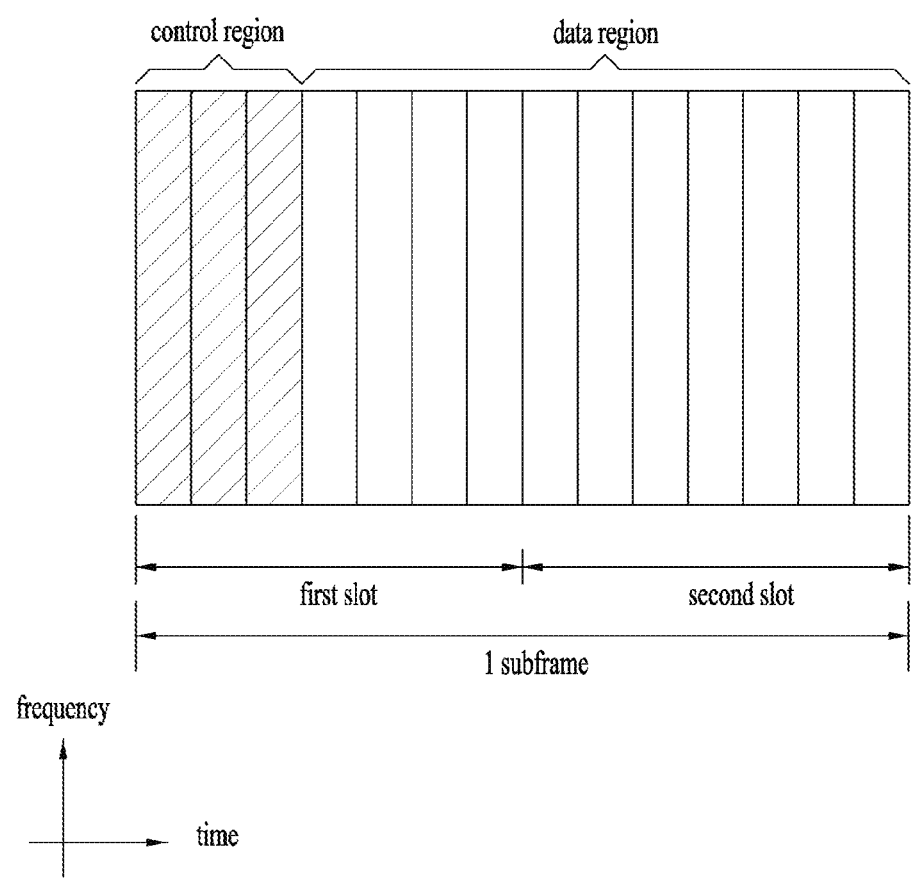
FIG. 5 illustrates a structure of a DL subframe, which may be used in embodiments of the present invention.

FIG. 5 illustrates a structure of a DL subframe that may be used in embodiments of the present invention.

Referring to FIG. 5, up to three OFDM symbols of a DL subframe, starting from OFDM symbol 0 are used as a control region to which control channels are allocated and antennas in communication environment supporting a massive antenna. The massive antenna can be easily implemented in a high frequency band (area of several GHz) where a distance between antennas is short.

Due to a characteristic of a massive antenna that many antennas are deployed in a narrow area, it may be impossible to implement a form that all antennas have independence of which a correlation is low among the antennas. And, in case of applying a beamforming scheme to the massive antenna, if a correlation between antennas is high, performance of the massive antenna can be maximized. Hence, extreme characteristics of the correlation between antennas have merits and demerits. Hence, if the correlation characteristic of the massive antenna is used, it is able to stably secure service coverage of a base station. In particular, when a control channel is transmitted, an effect of the correlation characteristic can be maximized.

And, the embodiments of the present invention can be applied not only to a cellular band equal to or less than 3 GHz but also to a high frequency wideband communication situation exceeding 3 GHz under an identical principle. And, the embodiments of the present invention can be applied not only to a legacy macro cell but also to a small cell. In the following, wireless access environment to which a massive antenna is applicable is explained.

2.1 Introducing a New Cell Centering on a Small Cell

A current 3GPP LTE-A system corresponds to a wireless access system operating based on Rel-10 to Rel-11 standard. The wireless access system to which embodiments of the present invention are applied may correspond to a system defined by standards appeared after LTE Rel-12 or later. In Rel-12 system, in order to more strengthen a service support according to a user, discussion on introduction of a local area cell (i.e., small cell) and introduction of an LAA (local area access) scheme are in progress.

Figure 6:
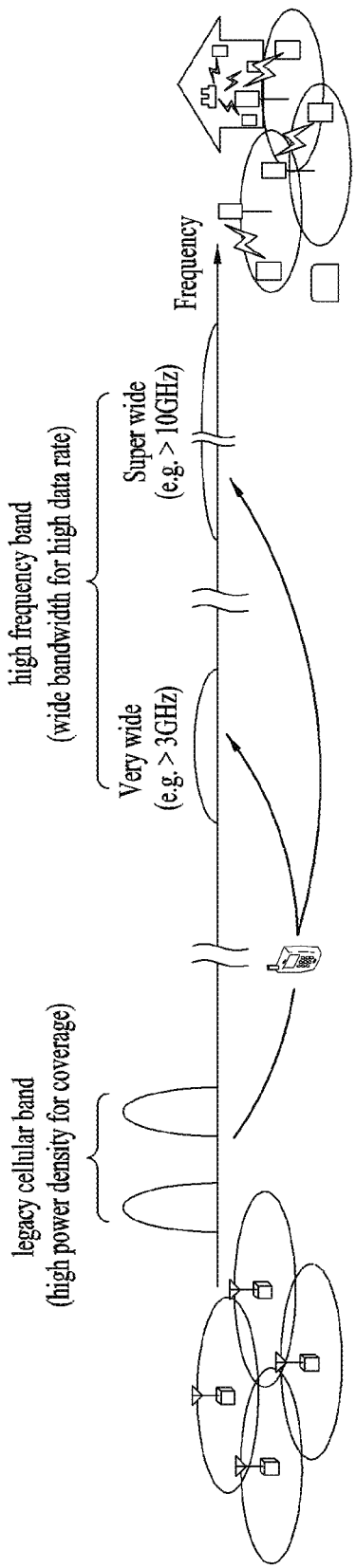
FIG. 6 is a diagram for a conceptual characteristic of a small cell.

FIG. 6 is a diagram for a conceptual characteristic of a small cell.

Referring to FIG. 6, a left side shows a legacy cellular band and a right side shows a high frequency band to which a small cell is applied. In particular, the small cell can be managed in a manner of setting a wider system band to a band of a higher center frequency instead of a frequency band managed by a LTE system corresponding to a legacy cellular system.

And, it may be able to use a small cell and legacy cellular cells in a manner of being mixed. For example, basic cell coverage is supported based on such a control signal as system information (SI) via a legacy cellular band and data transmission maximizing transmission efficiency can be performed using a wider frequency band via a small cell band of high frequency.

Hence, such a concept as LAA (local area access) to which the embodiments of the present invention are applicable can be applied to low-to-medium mobility UEs located at a narrower area. Coverage of a small cell may become a unit of 100 m smaller than coverage of a legacy cell (i.e., a cell of a cellular system) ranging from several km to hundreds of km unit. Hence, since a distance between a UE and a base station is short and a high frequency band is used in small cells, it may have channel properties described in the following in the small cells.

(1) Delay spread: As a distance between a base station and a UE is getting short, delay of a signal may become short.

(2) Subcarrier spacing: In case of applying an OFDM-based frame identical to a frame of a legacy system, since a frequency band assigned to each UE is big, subcarrier spacing used in a small cell can be configured by an extremely huge value greater than 15 kHz of a legacy LTE system.

(3) Doppler's frequency: Since a high frequency band is used in a small cell, a Doppler frequency higher than a low frequency band of identical UE mobility appears. Hence, coherent time may become extremely short.

2.2 Antenna System and 3D Beamforming

In a cellular system, a base station used to reduce inter-cell interference and increase SINR of UEs in a cell using a mechanical tilting scheme or an electrical titling scheme.

Figure 7:
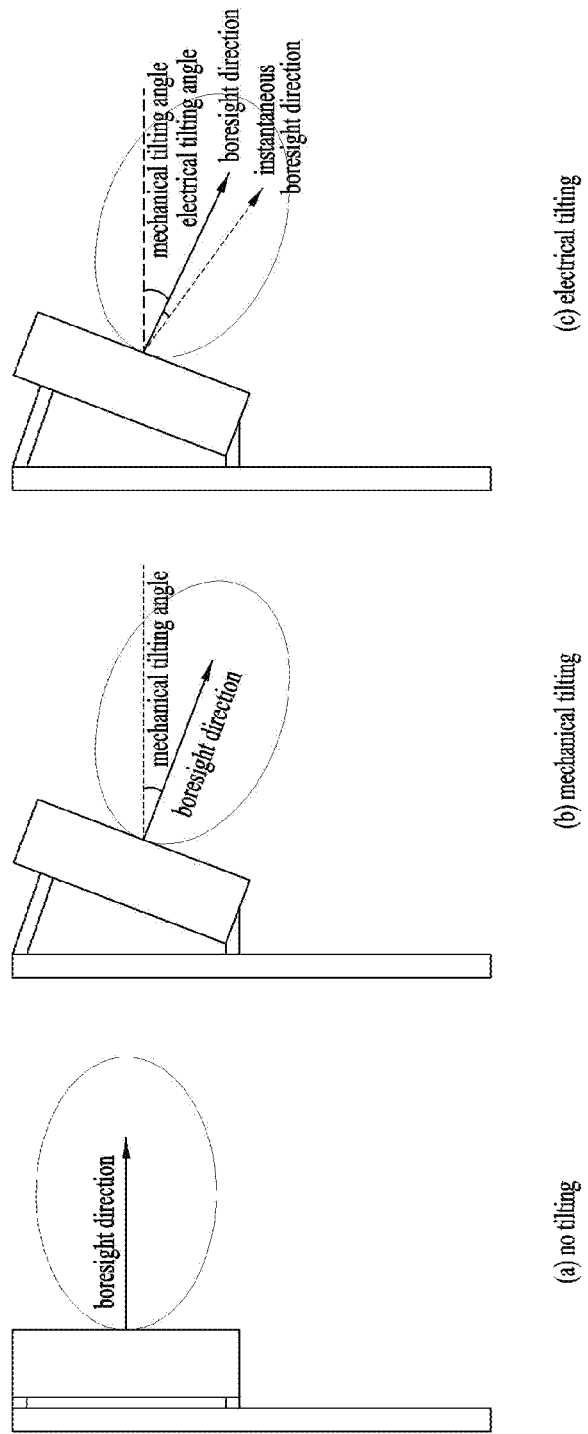
FIG. 7 illustrates examples of a tilting scheme.

FIG. 7 illustrates examples of a tilting scheme.

Tilting is used for the purpose of controlling a size of coverage of a cell by controlling main beam direction of an antenna to a specific angle or enhancing performance of a neighboring cell by reducing interference to the neighboring cell.

Referring to FIG. 7, FIG. 7(a) shows a shape of transmitting a signal of an antenna to which tilting is not applied, FIG. 7(b) shows a signal transmission scheme of an antenna to which a mechanical tilting is applied and FIG. 7(c) shows an example of a signal transmission scheme of an antenna to which an electrical tilting is applied.

Yet, in case of the mechanical tilting, it has a demerit in that a beam direction is fixed when an antenna is initially installed. In case of the electrical tilting, although a tilting angle is changeable using an internal phase shift module, it has a demerit in that it is able to perform very limitative vertical beamforming only due to actual cell-fixed titling of the electrical tilting.

Figure 8:
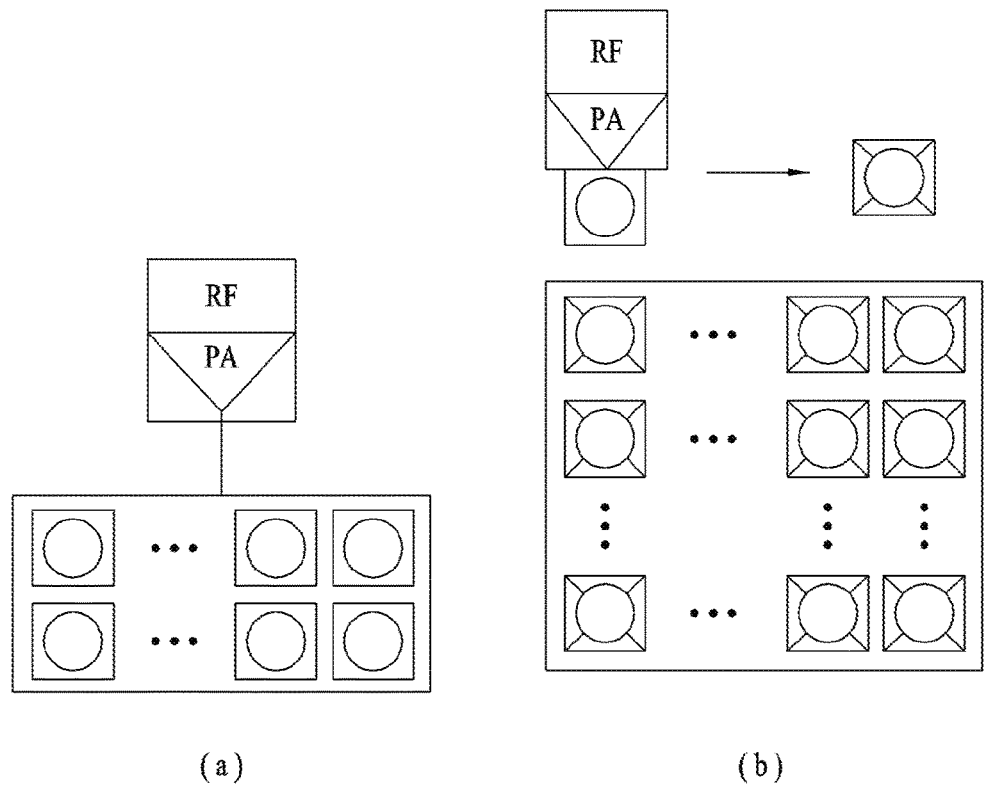
FIG. 8 is a diagram for an example of an AAS (active antenna system)
Figure 9:
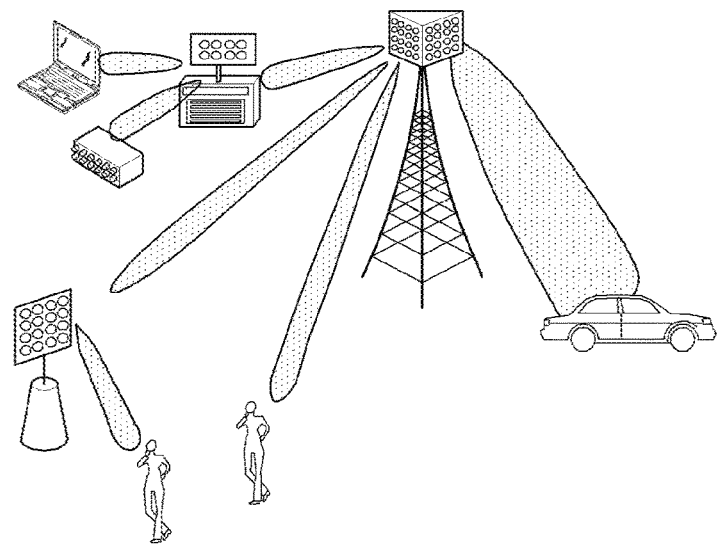
FIG. 9 is a diagram for an example of an active antenna-based UE-specific beamforming.
Figure 10:
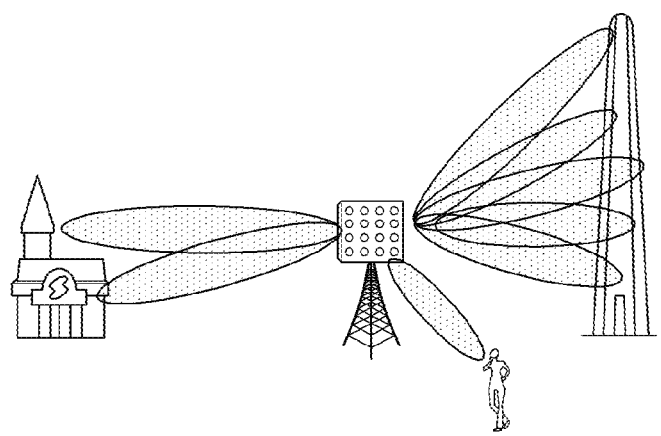
FIG. 10 is a diagram for an example of an active antenna-based two dimensional beamforming.

FIG. 8 is a diagram for an example of an AAS (active antenna system). And, FIG. 9 is a diagram for an example of an active antenna-based UE-specific beamforming and FIG. 10 is a diagram for an example of an active antenna-based two dimensional beamforming.

In this case, FIG. 8(a) shows an example of antenna array of a legacy antenna system and FIG. 8(b) shows an example of antenna array of an active antenna system.

Referring to FIG. 8(b), in case of an active antenna system, since each of antenna modules includes an RF (radio frequency) module as well as a power amplifier, it is able to control power and a phase for each of the antenna modules. Hence, if antenna array is configured by utilizing the active antenna system, it may be able to increase beam accuracy compared to legacy beam accuracy. Hence, it may be able to perform dynamic vertical beamforming due to the increased degree of freedom compared to a legacy electrical tilting.

In particular, if 2D antenna array is configured for a vertical/horizontal plane, it is able to more increase spatial degree of freedom. Hence, it is able to perform 3D pin-point beamforming as well. Therefore, as shown in FIG. 9, it is able to perform perfect UE-specific beam forming transmission rather than legacy cell-specific vertical beam-based UE-specific horizontal beam forming transmission.

In particular, it may mainly consider environment that an external base station transmits a beam to an internal UE (i.e., O2I: outdoor to indoor), outdoor small cell environment (e.g., Urban Micro) and the like as transmission environment using active antenna based 2D antenna array.

Referring to FIG. 10, a plurality of buildings may exist in a cell. In case of assuming such an actual cell environment as the aforementioned environment, it is necessary for a base station to consider not only UE-specific horizontal beam forming capability but also vertical beamforming capability in consideration of various UE heights according to a building height. When the aforementioned cell environment is considered, it is necessary to reflect channel properties (e.g., shadow/pathloss change according to a height difference, fading characteristic change including LoS/NLoS, DoA and the like, etc.) considerably different from legacy radio channel environment.

This may indicate that measurement for a channel including all or a part of a vertical and horizontal plane is required and channel information estimation for each case is required. Moreover, it is necessary for a UE to calculate an optimized CSI in a manner of including not only a channel of the UE but also an interference channel.

In this case, calculation complexity of the UE considerably increases. In particular, if a scale of antenna array increases for more accurate beamforming, not only the calculation complexity of the UE but also an amount of feedback information rapidly increases.

Hence, embodiments of the present invention described in the following propose a method of securing a transmit diversity using a correlation between antennas which is secured by a transmitter equipped with 2D antenna array consisting of a plurality of antennas.

3. Antenna Configuration Method Considering Correlation Between Antennas 3.1 Antenna Grouping FIG. 11 is a diagram for an example of configuring a two dimensional massive antenna and FIG. 12 is a diagram for an example of a method of grouping two dimensional massive antennas.

FIG. 11 shows a massive antenna consisting of 16 transmission antennas as a 4×4 2D antenna structure.

According to embodiments of the present invention, it is able to configure an identical group in a manner of binding a part of antennas of which a correlation is high with each other among a plurality of antennas consisting of a massive antenna. By doing so, a correlation between antennas becomes high in the identical antenna group and it may be able to induce a configuration of which a correlation is low between groups different from each other. In this case, since the correlation is low between the antenna groups different from each other, it may be able to basically assume that the antenna groups experience channels different from each other.

For example, in case of a massive antenna consisting of 16 antennas, if a correlation is high in 4 antennas in horizontal orientation as shown in FIG. 12(a) or if a correlation is high in 4 antennas in vertical orientation as shown in FIG. 12(b), the 4 antennas are configured as an identical antenna group. If antenna grouping is performed using the aforementioned method, as shown in FIG. 12(a) or FIG. 12(b), 4 antenna groups (hereinafter, 'sub group') are formed in the massive antenna.

In this case, if it is assumed that a receiving end has a single antenna, a channel between each antenna of a first subgroup (Subgroup#1) and a base station can be represented as $h_{11}^{(1)}$, $h_{21}^{(1)}$, $h_{31}^{(1)}$, $h_{41}^{(1)}$, respectively. In this case, since a correlation between the antennas belonging to the identical group is high, it may be able to assume $h_{11}^{(1)} \approx h_{21}^{(1)} \approx h_{31}^{(1)} \approx h_{41}^{(1)}$. In particular, all of the channels can be approximated as an identical channel.

It may be able to assume $h_{11}^{(2)} \approx h_{21}^{(2)} \approx h_{31}^{(2)} \approx h_{41}^{(2)}$ in a second subgroup using an identical method. Hence, channels between antennas in a subgroup do not change and all of the channels become static channels. Yet, since a correlation is low between antenna groups, it may have such a channel relation independent from each other as $h_{11}^{(1)} \neq h_{11}^{(2)}$ or $E(h_{11}^{(1)}, h_{11}^{(2)}) = 0$ between the first subgroup and the second subgroup.

Although FIG. 12 explains a grouping scheme under an assumption that a correlation is high between antennas contiguous in a horizontal axis or antennas contiguous in vertical axis, it may be able to configure a subgroup of a form different from a form shown in FIG. 12 in a manner of performing grouping again on antennas of which a correlation is high between massive antennas.

3.2 Method of Configuring a Pair Between Antenna Groups

In the following, a method of implementing a transmit diversity is explained based on a correlation between antenna groups mentioned earlier in 3.1 paragraph.

In case of transmitting a signal using a massive antenna, in order to maximally obtain a transmit diversity, it is necessary to have an antenna port providing channels independent from each other and a frequency/time domain resource providing a static channel section.

Figure 13:
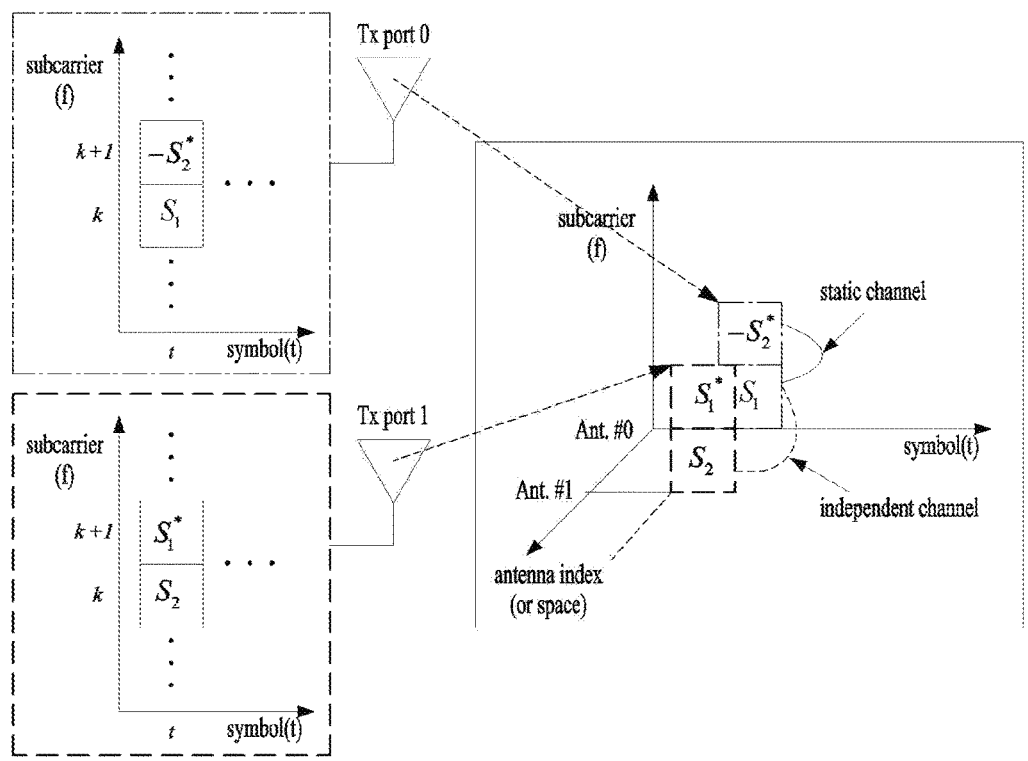
FIG. 13 is a diagram for an example of an SFBC transmission scheme.
Figure 14:
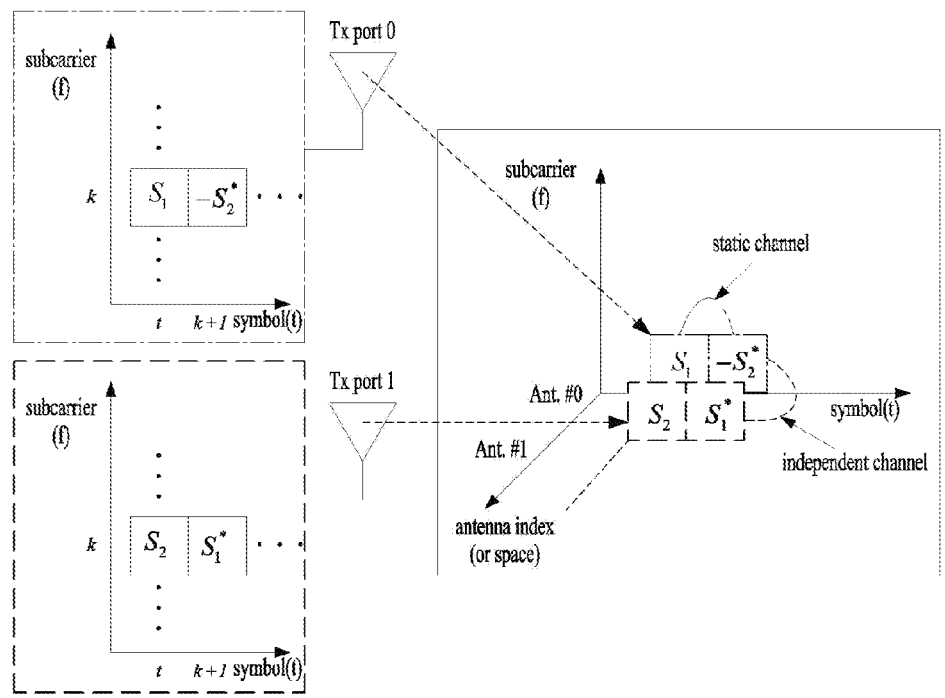
FIG. 14 is a diagram for an example of an STBC transmission scheme.

For example, as shown in FIG. 13, a widely used SFBC (space-frequency block code) transmission scheme corresponds to a scheme of maximizing a transmit diversity between independent antennas using a frequency resource consisting of an identical channel in contiguous frequency domain. As a different example, as shown in FIG. 14, there is an STBC (space-time block code) transmission scheme. The STBC transmission scheme can maximize a transmit diversity in a situation that a channel does not change between two contiguous time slots or two contiguous symbols.

Unlike the aforementioned legacy schemes, according to the embodiments of the present invention, it is able to obtain a transmit diversity in a manner of forming a pair between subgroups, which are grouped by reflecting a correlation between antennas. For example, as shown in FIG. 13 to FIG. 14, in order to obtain a transmit diversity, it is necessary to have two independent or uncorrelated antennas and a time resource of a static section or a frequency resource.

In particular, it indicates that a channel does not change in contiguous time/frequency domain in the section. In other word, a channel does not change between two symbol periods or two subcarriers and it is able to consider as a correlation between two symbol periods or two subcarriers is extremely high ($\rho=1$).

Hence, a transmit diversity can be configured in a manner of selecting a pair of which a correlation is low between antenna groups, which are grouped in 3.1 paragraph. On the contrary, since the pair has a correlation extremely high in an identical group, the pair can be used for the purpose of replacing with a static time/frequency resource.

Figures 15, 16:
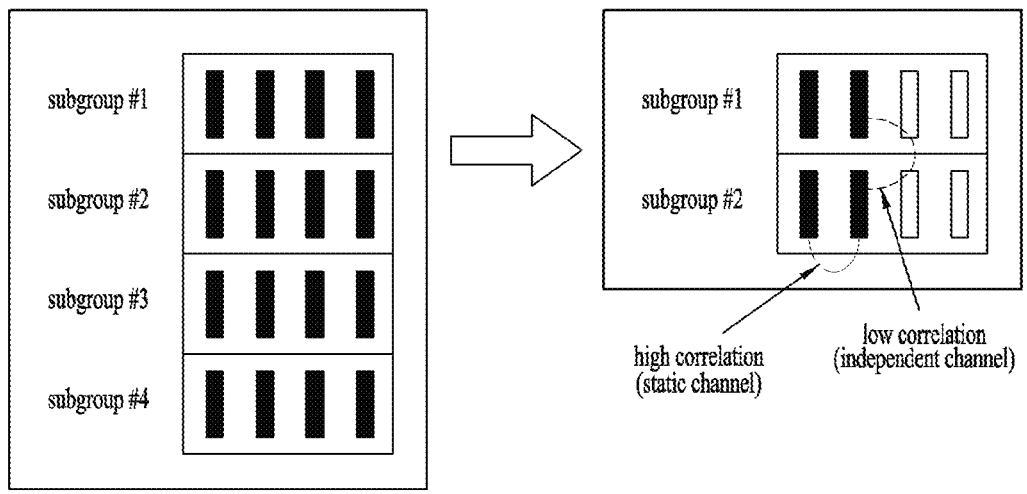
FIG. 15 is a diagram for one of a method of selecting a subgroup for applying a transmit diversity and a method of selecting an antenna in a subgroup.
FIG. 16 is a diagram for one of methods of adding a transmit diversity using a correlation of an antenna.

FIG. 15 is a diagram for one of a method of selecting a subgroup for applying a transmit diversity and a method of selecting an antenna in a subgroup.

Referring to FIG. 15, subgroups of which a correlation is low are selected from the subgroups mentioned earlier in FIG. 12 and a transmit diversity can be applied in the selected subgroups. For example, in FIG. 15, assume that a first subgroup and a second subgroup correspond to antenna groups of which a correlation is low with each other. Hence, the first subgroup and the second subgroup are selected. And, two antennas of which a correlation is highest can be selected from the first and the second subgroup, respectively.

In FIG. 15, two subgroups are selected in a manner of assuming data symbol transmission using 4 antenna ports and two antennas are respectively selected from the two subgroups. Hence, if the number of antenna ports increases, the different number of subgroups and antennas can be selected according to the increase of the antenna ports.

In this case, if a data symbol transmitted from each antenna is assigned as shown in FIG. 16, it is able to transmit a signal capable of obtaining a transmit diversity. FIG. 16 is a diagram for one of methods of adding a transmit diversity using a correlation of an antenna. For example, assume that an antenna 1 and an antenna 2 are sequentially selected from a first subgroup and an antenna 5 and an antenna 6 are sequentially selected from a second subgroup.

In this case, $s_1$, $-s_2^*$ symbols are transmitted from the antenna 1 and the antenna 2, respectively, and $s_2$, $s_1^*$ are transmitted from the antenna 5 and the antenna 6, respectively. Hence, an intra-antenna group corresponds to an area indicating antenna assignment in a subgroup of which a correlation is high between antennas and an inter-antenna group corresponds to an area indicating antenna assignment between independent subgroups of which a correlation is low between antennas.

Lastly, it may be able to apply a diversity transmission scheme, which is implemented using an antenna domain only using a resource of an identical time-frequency domain. The transmit diversity scheme mentioned earlier in FIG. 16 is explained based on a 3D drawing to which an antenna axis is added.

Figure 17:
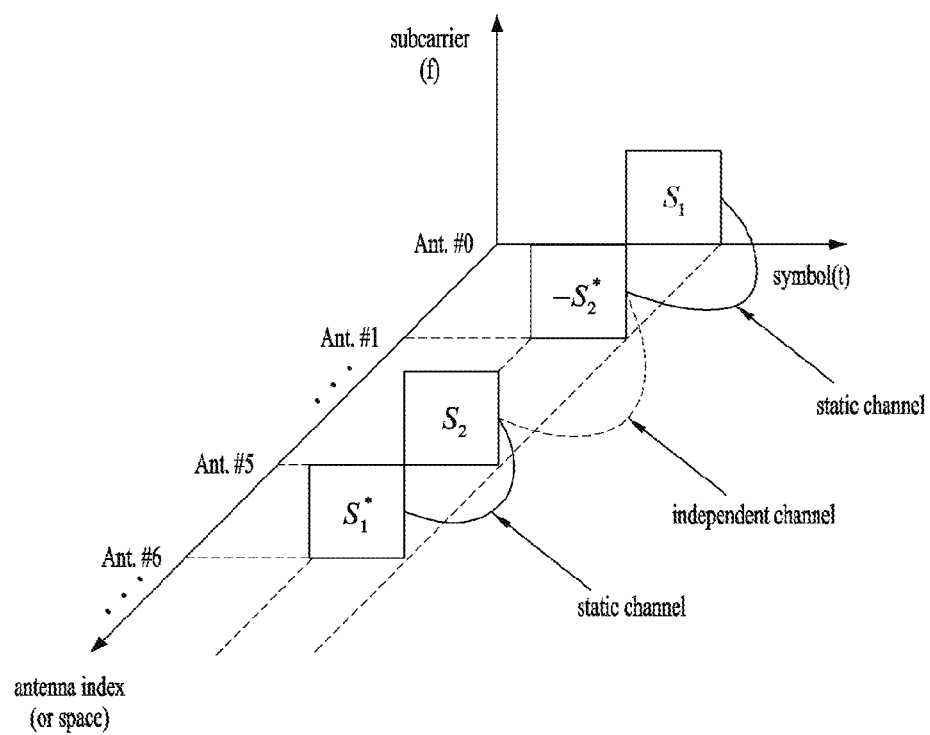
FIG. 17 is a diagram for an example of a diversity transmission scheme using an identical time-frequency resource using a correlation of an antenna.

FIG. 17 is a diagram for an example of a diversity transmission scheme using an identical time-frequency resource using a correlation of an antenna.

Referring to FIG. 17, x axis corresponds to time domain and indicates a symbol unit, y axis corresponds to frequency domain and indicates a subframe unit and z axis corresponds to an antenna area (i.e., space area) and indicates an antenna unit.

In particular, explanation is made on the basis of the antenna area. While 4 data symbols transmitted via an antenna 1, 2, 5 and 6 are transmitted via an identical time-frequency resource region, the 4 data symbols are transmitted in a manner of being spatially separated from each other using antenna ports different from each other. In this case, $s_1$, $-s_2^*$ are transmitted via a static channel and $s_2$, $s_1^*$ are transmitted via an independent channel. By doing so, it may be able to provide a transmit diversity.

3.3 Transceiving Data Symbol Using Correlation of Antenna

Figure 18:
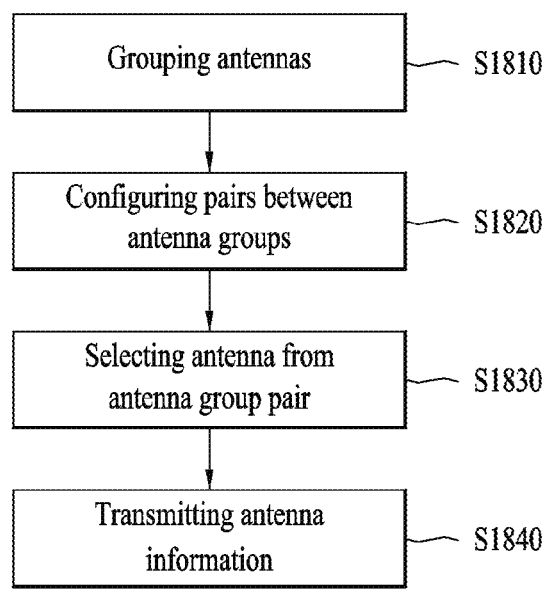
FIG. 18 is a flowchart for a method of transceiving a data symbol using a correlation of an antenna.

FIG. 18 is a flowchart for a method of transceiving a data symbol using a correlation of an antenna.

In the embodiments of the present invention, both a transmitting end and a receiving end can include a massive antenna or the transmitting end can include the massive antenna only. The massive antenna corresponds to an antenna that a plurality of antennas are deployed in a prescribed antenna area in a manner of being integrated with each other.

In order to transmit a data symbol, the transmitting end configures antenna subgroups by grouping antennas of which a correlation is high among a plurality of the antennas constructing the massive antenna (refer to 3.1 paragraph) [S1810].

Subsequently, the transmitting end configures pairs between the antenna subgroups. For more details, it may refer to 3.2 paragraph. In this case, the pairs between the antenna subgroups consist of subgroups of which a correlation is low with each other [S1820].

The transmitting end respectively selects an antenna from the configured pairs between the antenna subgroups. In this case, the number of selected subgroups and the number of antennas may vary according to the number of antennas ports of the transmitting end [S1830].

In the step of S1830, regarding the procedure of selecting an antenna, it may refer to the contents mentioned earlier in FIG. 15 to FIG. 17.

The transmitting end can transmit antenna configuration information indicating information on a selected subgroup and/or information on selected antennas to the receiving end [S1840]

Subsequently, the transmitting end can transmit a data symbol using the selected antennas.

In FIG. 18, in case of downlink data transmission, the transmitting end may correspond to a base station. In case of uplink data transmission, the transmitting end may correspond to a user equipment. In case of the uplink data transmission, the base station configures antenna configuration information on a massive antenna of the user equipment and may be able to transmit the antenna configuration information to the user equipment.

3.4 Method of Transmitting Antenna Configuration Information

In the following, the method of transceiving antenna configuration information mentioned earlier in the step S1840 of FIG. 18 is explained in detail.

It is preferable for a transmitting end (e.g., base station) to transmit information on an antenna configuration operating a transmit diversity mode to a receiving end (e.g., UE). To this end, the base station can signal the antenna configuration information to the UE. For example, the base station can dynamically transmit the antenna configuration information to the UE via a DL grant or can semi-statically transmit the antenna configuration information to the UE via high layer signaling.

In this case, it may be able to use ON/OFF 1 bit indicating a transmit diversity operation as the antenna configuration information. In this case, the 1-bit antenna configuration information simply indicates that a base station transmits a downlink data to a UE in the transmit diversity mode mentioned earlier in the embodiments of the present invention or indicates that the downlink data is transmitted in a normal mode.

Of course, the base station can transmit information on each transmission antenna group and information on selected antennas using antenna configuration information equal to or greater than 2 bits.

In order to support transmit diversity, a UE can estimate channels between base stations equipped with a plurality of antennas. In this case, assume that channels according to each antenna are achieved via orthogonal pilot allocation of time-frequency domain. Hence, the UE can estimate a correlation according to each antenna based on channel information estimated in a specific area.

For example, if it is assumed that a correlation according to an antenna is defined using 2-bit information according to an antenna, it is able to configure Table 2 in the following.

TABLE 2

| | Ant. Index | | | | | | | |
|---|---|---|---|---|---|---|---|---|
| correlation | #1 | #2 | #3 | #4 | #5 | #6 | #7 | #8 |
| 00 | ✓ | ✓ | | | | | | |
| 01 | | | ✓ | ✓ | | | | |
| 10 | | | | | | | ✓ | ✓ |
| 11 | | | | | ✓ | ✓ | | |

Table 2 shows an example for a case that a massive antenna consists of 8 antennas. If a massive antenna consists of 9 or more antennas, Table 2 can be extended according to the number of antennas. And, although Table 2 shows two antennas of which a correlation is high only, it may be able to configure three or more antennas of which a correlation is high to be indicated.

If a base station receives such feedback information as information shown in Table 2, the base station can configure the total 4 antenna subgroups and it is able to know that a correlation is high according to 2 antennas in each subgroup.

As a different method, a UE can estimate a correlation for each antenna configuration via channel estimation. In this case, although the UE can make a feedback on information on the correlation for each antenna to the base station like Table 2, the UE can perform subgrouping on a massive antenna of the base station and may be able to selectively feedback on antenna configuration information.

For example, the UE can transmit subgrouping information on all antenna configurations in such a bitmap form as '00 00 01 01 11 11 10 10'. This scheme is similar to Table 2. Yet, in case of transmitting information on subgroup #1 and #2 preferred by the UE, the UE feedbacks '00 00 01 01 -- -- -- --' to the base station. In this case, if a filler bit or a null bit is inserted into a part in which information is not transmitted instead, the base station can easily perform comprehension of the feedback information.

4. Apparatuses

Apparatuses illustrated in FIG. 18 are means that can implement the methods described before with reference to FIGS. 1 to 18.

A UE may act as a transmission end on a UL and as a reception end on a DL. ABS may act as a reception end on a UL and as a transmission end on a DL.

That is, each of the UE and the BS may include a Transmitter (Tx) 1940 or 1950 and Receiver (Rx) 1960 or 1970, for controlling transmission and reception of information, data, and/or messages, and an antenna 1900 or 1910 for transmitting and receiving information, data, and/or messages.

Each of the UE and the BS may further include a processor 1920 or 1930 for implementing the afore-described embodiments of the present invention and a memory 1980 or 1990 for temporarily or permanently storing operations of the processor 1920 or 1930.

Embodiments of the present invention can be performed using the aforementioned configuration component and the functions of the UE and the base station. For example, a processor of the base station or a processor of the UE performs grouping on antennas of which a correlation is high with each other in a massive antenna, selects subgroups of which a correlation is low between the grouped sub antenna groups and respectively selects an antenna from the selected sub antenna groups in a manner of combining the methods disclosed in the aforementioned paragraph 1 to 3 with each other. For more details, it may refer to the contents mentioned earlier in FIG. 11 to FIG. 18.

Figure 19:
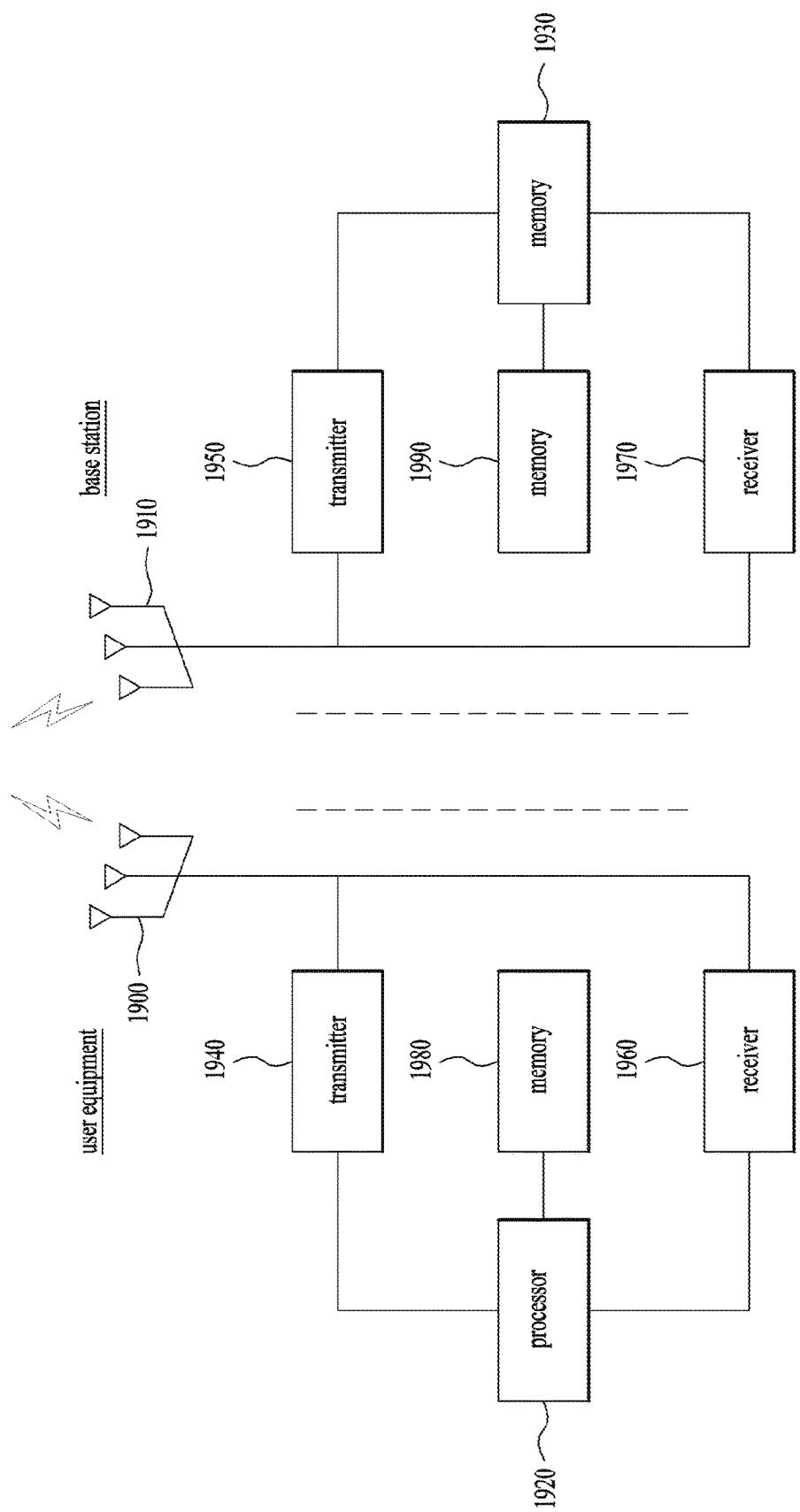
FIG. 19 is a diagram for an apparatus capable of implementing the methods explained in FIGS. 1 to 18.

The Tx and Rx of the UE and the BS may perform a packet modulation/demodulation function for data transmission, a high-speed packet channel coding function, OFDMA packet scheduling, TDD packet scheduling, and/or channelization. Each of the UE and the BS of FIG. 19 may further include a low-power Radio Frequency (RF)/Intermediate Frequency (IF) module.

Meanwhile, the UE may be any of a Personal Digital Assistant (PDA), a cellular phone, a Personal Communication Service (PCS) phone, a Global System for Mobile (GSM) phone, a Wideband Code Division Multiple Access (WCDMA) phone, a Mobile Broadband System (MBS) phone, a hand-held PC, a laptop PC, a smart phone, a Multi Mode-Multi Band (MM-MB) terminal, etc.

The smart phone is a terminal taking the advantages of both a mobile phone and a PDA. It incorporates the functions of a PDA, that is, scheduling and data communications such as fax transmission and reception and Internet connection into a mobile phone. The MB-MM terminal refers to a terminal which has a multi-modem chip built therein and which can operate in any of a mobile Internet system and other mobile communication systems (e.g. CDMA 2000, WCDMA, etc.).

Embodiments of the present invention may be achieved by various means, for example, hardware, firmware, software, or a combination thereof.

In a hardware configuration, the methods according to exemplary embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the methods according to the embodiments of the present invention may be implemented in the form of a module, a procedure, a function, etc. performing the above-described functions or operations. A software code may be stored in the memory 1980 or 1990 and executed by the processor 1940 or 1930. The memory is located at the interior or exterior of the processor and may transmit and receive data to and from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein. It is obvious to those skilled in the art that claims that are not explicitly cited in each other in the appended claims may be presented in combination as an embodiment of the present invention or included as a new claim by a subsequent amendment after the application is filed.

INDUSTRIAL APPLICABILITY

Embodiments of the present invention are applicable to various wireless access systems including a 3GPP system, a 3GPP2 system, and/or an IEEE 802.xx system. In addition to these wireless access systems, the embodiments of the present invention are applicable to all technical fields in which the wireless access systems find their applications.

What is claimed is:

1. A method of transmitting data symbols using an antenna correlation in a wireless access system supporting multiple input/multiple output (MIMO), the method performed by a transmitting end and comprising:
   receiving, from a receiving end, grouping information of a plurality of antennas for supporting the MIMO,
   wherein the grouping information includes bitmap information on two antenna subgroups selected from two or more antenna subgroups by the receiving end,
   wherein antennas of the plurality of antennas having the highest correlation are grouped into the two or more antenna subgroups by the receiving end, and
   wherein the two antenna subgroups, of which a correlation is lowest from the two or more antenna subgroups, are selected from among the two or more antenna subgroups by the receiving end;
   selecting two antennas from each of the two selected antenna subgroups for transmitting the data symbols, the two antennas selected from each subgroup being two antennas having a highest correlation within the respective subgroup; and
   transmitting different data symbols through each of the two selected antennas of the two selected antenna subgroups on an identical time frequency resource.

2. The method of claim 1, wherein the bitmap information further includes a null bit or a filler bit for unselected antenna subgroups.

3. The method of claim 1, further comprising:
   transmitting antenna configuration information indicating at least one of the antenna subgroups or the selected antennas to the receiving end.

4. The method of claim 1, wherein the selected two antenna subgroups are selected in consideration of the number of antenna ports of a transmitting end and the number of the data symbols.

5. A transmitting end transmitting data symbols using an antenna correlation in a wireless access system supporting multiple input/multiple output (MIMO), the transmitting end comprising:
   a receiver;
   a transmitter;
   a plurality of antennas;

a memory; and a processor;

wherein the memory is configured to store instructions for the processor, and wherein the processor is configured to:

control the receiver to receive, from a receiving end, grouping information of a plurality of antennas for supporting the MIMO, wherein the grouping information includes bitmap information on two antenna subgroups selected from two or more antenna subgroups by the receiving end, wherein antennas of the plurality of antennas having the highest correlation are grouped into the two or more antenna subgroups by the receiving end, wherein the two antenna subgroups, of which a correlation is lowest from the two or more antenna subgroups, are selected from among the two or more antenna subgroups by the receiving end, select two antennas from each of the two selected antenna subgroups for transmitting the data symbols, the two antennas selected from each subgroup being two antennas having a highest correlation within the respective subgroup, and control the transmitter to transmit different data symbols through each of the two selected antennas of the two selected antenna subgroups on an identical time frequency resource.

6. The transmitting end of claim 5, wherein the bitmap information further includes a null bit or a filler bit for unselected antenna subgroups.

7. The transmitting end of claim 5, wherein the processor is further configured to control the transmitter to transmit antenna configuration information indicating at least one of the antenna subgroups or the selected antennas to the receiving end via the plurality of antennas.

8. The transmitting end of claim 5, wherein the selected two antenna subgroups are selected in consideration of the number of antenna ports of a transmitting end and the number of the data symbols.

* * * * *